(12) United States Patent
Reque et al.

(10) Patent No.: US 9,537,788 B2
(45) Date of Patent: Jan. 3, 2017

(54) AUTOMATIC DETERMINATION OF RESOURCE SIZING

(71) Applicant: Amazon Technologies, Inc., Seattle, WA (US)

(72) Inventors: Sean Philip Reque, Everett, WA (US); Derek Steven Manwaring, Lynnwood, WA (US); Dylan Chandler Thomas, Seattle, WA (US); Timothy Allen Wagner, Seattle, WA (US); Xin Zhao, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 24 days.

(21) Appl. No.: 14/562,601

(22) Filed: Dec. 5, 2014

(65) Prior Publication Data

US 2016/0164797 A1    Jun. 9, 2016

(51) Int. Cl.
| | | |
|---|---|---|
| *G06F 9/50* | (2006.01) | |
| *G06F 9/455* | (2006.01) | |
| *G06F 9/445* | (2006.01) | |
| *H04L 12/911* | (2013.01) | |

(52) U.S. Cl.
CPC .............. *H04L 47/70* (2013.01); *G06F 9/445* (2013.01); *G06F 9/45533* (2013.01); *G06F 9/50* (2013.01); *G06F 2009/45562* (2013.01)

(58) Field of Classification Search
None
See application file for complete search history.

(56) References Cited

U.S. PATENT DOCUMENTS

| | | |
|---|---|---|
| 6,708,276 B1 | 3/2004 | Yarsa et al. |
| 7,665,090 B1 | 2/2010 | Tormasov et al. |
| 7,707,579 B2 | 4/2010 | Rodriguez |
| 7,823,186 B2 | 10/2010 | Pouliot |
| 8,010,990 B2 | 8/2011 | Ferguson et al. |
| 8,024,564 B2 | 9/2011 | Bassani et al. |

(Continued)

FOREIGN PATENT DOCUMENTS

| | | |
|---|---|---|
| WO | WO 2009/137567 A1 | 11/2009 |
| WO | WO 2016/053950 A1 | 4/2016 |

(Continued)

OTHER PUBLICATIONS

Vaquero et al. "Dynamically scaling applications in the cloud." ACM SIGCOMM Computer Communication Review 41.1 (2011): 45-52. Retrieved on [Aug. 28, 2016] Retrieved from the Internet: URL<http://dl.acm.org/citation.cfm?id=1925869>.*

(Continued)

*Primary Examiner* — Thuy Dao
*Assistant Examiner* — Cheneca Smith
(74) *Attorney, Agent, or Firm* — Knobbe, Martens, Olson & Bear, LLP

(57) ABSTRACT

A system for providing automatic resource resizing is provided. The system may be configured to maintain a plurality of virtual machine instances. The system may be further configured to receive a request to execute a program code and allocate computing resources for executing the program code on one of the virtual machine instances. The amount of resources allocated for executing the program code may be specified by the request and adjusted as needed.

16 Claims, 7 Drawing Sheets

(56) References Cited

U.S. PATENT DOCUMENTS

| | | | |
|---|---|---|---|
| 8,046,765 B2* | 10/2011 | Cherkasova | G06F 9/5061 718/104 |
| 8,065,676 B1 | 11/2011 | Sahai et al. | |
| 8,095,931 B1 | 1/2012 | Chen et al. | |
| 8,166,304 B2 | 4/2012 | Murase et al. | |
| 8,171,473 B2 | 5/2012 | Lavin | |
| 8,429,282 B1 | 4/2013 | Ahuja | |
| 8,448,165 B1 | 5/2013 | Conover | |
| 8,825,964 B1* | 9/2014 | Sopka | G06F 3/0671 711/152 |
| 9,146,764 B1 | 9/2015 | Wagner | |
| 9,323,556 B2 | 4/2016 | Wagner | |
| 2004/0249947 A1 | 12/2004 | Novaes et al. | |
| 2005/0132368 A1 | 6/2005 | Sexton et al. | |
| 2007/0094396 A1 | 4/2007 | Takano et al. | |
| 2007/0130341 A1 | 6/2007 | Ma | |
| 2008/0028409 A1* | 1/2008 | Cherkasova | G06F 9/5061 718/104 |
| 2008/0126486 A1 | 5/2008 | Heist | |
| 2008/0189468 A1 | 8/2008 | Schmidt et al. | |
| 2008/0201711 A1 | 8/2008 | Husain | |
| 2009/0055810 A1 | 2/2009 | Kondur | |
| 2009/0077569 A1 | 3/2009 | Appleton et al. | |
| 2009/0158275 A1 | 6/2009 | Wang et al. | |
| 2009/0198769 A1 | 8/2009 | Keller et al. | |
| 2009/0204964 A1 | 8/2009 | Foley et al. | |
| 2010/0023940 A1* | 1/2010 | Iwamatsu | G06F 1/3203 718/1 |
| 2010/0031274 A1 | 2/2010 | Sim-Tang | |
| 2010/0031325 A1 | 2/2010 | Maigne et al. | |
| 2010/0186011 A1 | 7/2010 | Magenheimer | |
| 2011/0029970 A1 | 2/2011 | Arasaratnam | |
| 2011/0055378 A1 | 3/2011 | Ferris et al. | |
| 2011/0099551 A1 | 4/2011 | Fahrig et al. | |
| 2011/0134761 A1 | 6/2011 | Smith | |
| 2011/0153838 A1 | 6/2011 | Belkine et al. | |
| 2011/0184993 A1 | 7/2011 | Chawla et al. | |
| 2011/0265164 A1 | 10/2011 | Lucovsky | |
| 2012/0072914 A1 | 3/2012 | Ota | |
| 2012/0096468 A1* | 4/2012 | Chakravorty | G06F 9/50 718/103 |
| 2012/0110155 A1 | 5/2012 | Adlung et al. | |
| 2012/0110164 A1 | 5/2012 | Frey et al. | |
| 2012/0110588 A1 | 5/2012 | Bieswanger et al. | |
| 2012/0192184 A1 | 7/2012 | Burckart et al. | |
| 2012/0331113 A1 | 12/2012 | Jain et al. | |
| 2013/0097601 A1 | 4/2013 | Podvratnik et al. | |
| 2013/0111469 A1 | 5/2013 | B et al. | |
| 2013/0179574 A1 | 7/2013 | Calder et al. | |
| 2013/0179894 A1 | 7/2013 | Calder et al. | |
| 2013/0185729 A1 | 7/2013 | Vasic et al. | |
| 2013/0219390 A1* | 8/2013 | Lee | G06F 9/455 718/1 |
| 2013/0227641 A1 | 8/2013 | White et al. | |
| 2013/0263117 A1* | 10/2013 | Konik | G06F 9/5077 718/1 |
| 2013/0297964 A1 | 11/2013 | Hegdal et al. | |
| 2013/0339950 A1 | 12/2013 | Ramarathinam et al. | |
| 2013/0346946 A1 | 12/2013 | Pinnix | |
| 2013/0346987 A1 | 12/2013 | Raney et al. | |
| 2014/0007097 A1* | 1/2014 | Chin | G06F 9/45533 718/1 |
| 2014/0019965 A1 | 1/2014 | Neuse et al. | |
| 2014/0019966 A1 | 1/2014 | Neuse et al. | |
| 2014/0040857 A1 | 2/2014 | Trinchini et al. | |
| 2014/0068611 A1 | 3/2014 | McGrath et al. | |
| 2014/0082165 A1* | 3/2014 | Marr | G06F 9/5044 709/222 |
| 2014/0101649 A1 | 4/2014 | Kamble et al. | |
| 2014/0109087 A1 | 4/2014 | Jujare et al. | |
| 2014/0130040 A1 | 5/2014 | Lemanski | |
| 2014/0173614 A1* | 6/2014 | Konik | G06F 9/4881 718/104 |
| 2014/0173616 A1 | 6/2014 | Bird et al. | |
| 2014/0180862 A1 | 6/2014 | Certain et al. | |
| 2014/0215073 A1 | 7/2014 | Dow et al. | |
| 2014/0245297 A1 | 8/2014 | Hackett | |
| 2014/0279581 A1 | 9/2014 | Devereaux | |
| 2014/0282615 A1 | 9/2014 | Cavage et al. | |
| 2014/0289286 A1 | 9/2014 | Gusak | |
| 2014/0304698 A1 | 10/2014 | Chigurapati et al. | |
| 2015/0120928 A1 | 4/2015 | Gummaraju et al. | |
| 2016/0092250 A1 | 3/2016 | Wagner et al. | |
| 2016/0092252 A1 | 3/2016 | Wagner | |

FOREIGN PATENT DOCUMENTS

| | | |
|---|---|---|
| WO | WO 2016/053968 A1 | 4/2016 |
| WO | WO 2016/053973 A1 | 4/2016 |

OTHER PUBLICATIONS

Espadas et al. "A tenant-based resource allocation model for scaling Software-as-a-Service applications over cloud computing infrastructures." Future Generation Computer Systems 29.1 (2013): 273-286.Retrieved on [Aug. 28, 2016] Retrieved from the Internet: URL<http://www.sciencedirect.com/science/article/pii/S0167739X1100210X>.*

Espadas et al. "A tenant-based resource allocation model for scaling Software-as-a-Service applications over cloud computing infrastructures." Future Generation Computer Systems 29.1 (2013): 273-286.Retrieved on [Apr. 21, 2016] Retrieved from the Internet: URLhttp://www.sciencedirect.com/science/articie/pii/S0167739X1100210X.

Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.

International Search Report and Written Opinion in PCT/US2015/052810dated Dec. 17, 2015, 18 pages.

International Search Report and Written Opinion in PCT/US2015/052838 dated Dec. 18, 2015, 23 pages.

International Search Report and Written Opinion in PCT/US2015/052833dated Jan. 13, 2016, 17 pages.

International Search Report and Written Opinion in PCT/US2015/064071dated Mar. 16, 2016, 17 pages.

International Search Report and Written Opinion in PCT/US2016/016211dated Apr. 13, 2016 11 pages.

* cited by examiner

AUTOMATIC DETERMINATION OF RESOURCE SIZING

CROSS-REFERENCE TO OTHER APPLICATIONS

The present application's Applicant previously filed the following U.S. patent application on Sep. 30, 2014: application Ser. No. 14/502,992, titled THREADING AS A SERVICE Further, the present application's Applicant is concurrently filing the following U.S. patent application Ser. No. 14/562,577 on Dec. 5, 2014: titled AUTOMATIC MANAGEMENT OF RESOURCE SIZING The disclosures of the above-referenced applications are hereby incorporated by reference in their entireties.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
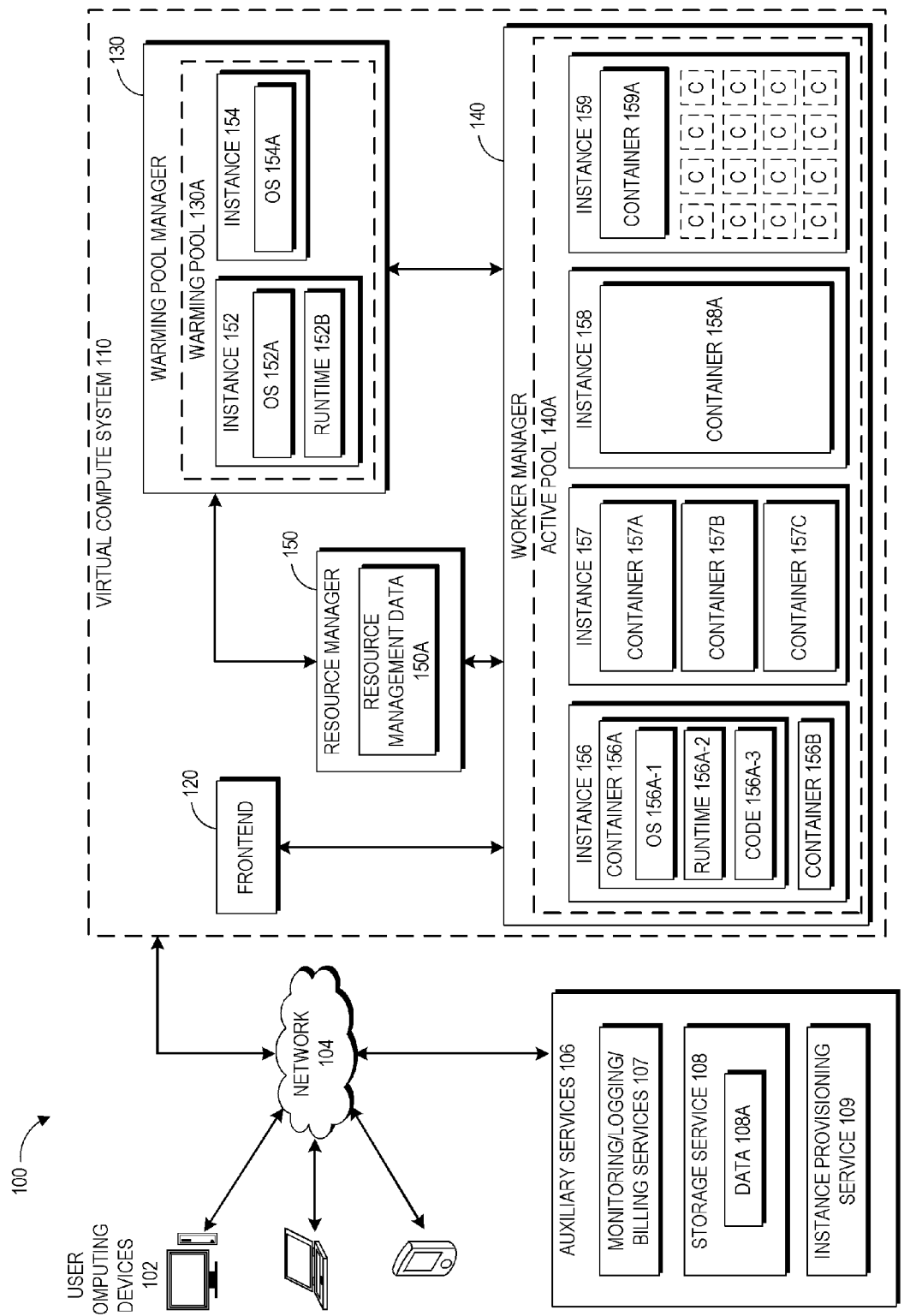
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased (e.g., in the form of virtual machine instances), developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by maintaining a pool of pre-initialized virtual machine instances that are ready for use as soon as a user request is received, delay (sometimes referred to as latency) associated with executing the user code (e.g., instance and language runtime startup time) can be significantly reduced.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/reassigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may monitor and log information related to the amount of resources allocated for executing user code. By doing so, the virtual compute system may be able to identify opportunities for improving the performance of the user code execution by adjusting the amount of allocated resources. Error rates may be reduced by increasing the amount of allocated resources in the event of over-utilization, and costs associated with executing the user code may be reduced by decreasing the amount of allocated resources in the event of under-utilization.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a resource manager 150. In the depicted example, virtual machine instances ("instances") 152, 154 are shown in a warming pool 130A managed by the warming pool manager 130, and instances 156, 157, 158, 159 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 157, 158, 159 can be implemented on one or more physical computing devices in different various geographic regions. Similarly, each of the frontend 120, the warming pool manager 130, the worker manager 140, and the resource manager 150 can be implemented across multiple physical computing devices. Alternatively, one or more of the frontend 120, the warming pool manager 130, the worker manager 140, and the resource manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, CPU, storage, network packets, etc.) to be reserved for executing the program code. For example, the program code may be provided with the request, previously uploaded by the user, provided by the virtual compute system 110 (e.g., standard routines), and/or provided by third parties. In some embodiments, resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the resource-level constraints are adjusted over time and may vary across different executions of a single program code. For example, the same program code may be used to process two different sets of data, where one set of data requires more resources than the other. In such a case, the user may specify different resource constraints for the two different executions or the virtual compute system 110 may automatically adjust the amount of resources allocated to each execution of the program code based on spatial (e.g., in other parts of the virtual compute system 110) or historical (e.g., over time) trends for the user and/or program code. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); and etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157, 158, 159. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1 (e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C, the instance 158 includes a container 158A, and the instance 159 includes a container 159A.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C, 159A may be equally sized, and the container 158A may be larger (e.g., have more computing resources allocated thereto) than the containers 157A, 157B, 157C, 159A. The dotted boxes labeled "C" shown in the instance 159 indicate the space remaining on the instances that may be used to create new instances. In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance. For example, five containers having a memory size of 1 GB (5 GB in total) may be created in an instance having a memory size of 4 GB. If each of the containers does not reach the full capacity of 1 GB, the containers may function properly despite the over-subscription.

Although the components inside the containers 156B, 157A, 157B, 157C, 158A, 159A are not illustrated in the example of FIG. 1, each of these containers may have various operating systems, language runtimes, libraries, and/or user code. In some embodiments, instances may have user codes loaded thereon (e.g., in an instance-level cache), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manager 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services. The monitoring/logging/billing services 107 may communicate with the resource manager 150 to allow the resource manager 150 to determine the appropriate amount of resources to be used for executing the various program codes on the virtual compute system 150.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The resource manager 150 manages the amount of resources allocated for processing incoming requests to execute user code on the virtual compute system 110. For example, the resource manager 150 may communicate with the frontend 120, the warming pool manager 130, the worker manager 140, and/or the auxiliary services 106 to monitor and manage the compute capacity allocated to (and used by) the various program codes executed on the virtual compute system 110. Although the resource manager 150 is illustrated as a distinct component within the virtual compute system 110, part or all of the functionalities of the resource manager 150 may be performed by the frontend 120, the warming pool manager 130, the worker manager 140, and/or the auxiliary services 106. For example, the resource manager 150 may be implemented entirely within one of the other components of the virtual compute system 110 or in a distributed manner across the other components of the virtual compute system 110. In the example of FIG. 1, the resource manager 150 includes resource management data 150A. The resource management data 150A may include data regarding the history of incoming requests (e.g., the volume of incoming requests associated with a particular program code, the peak hours during which those requests are received, etc.), resource-level constraints specified by the incoming requests, the amount of resources allocated to the incoming requests, the portion of the allocated resources actually utilized by the incoming requests, and any other characteristics or metrics that may be used by the resource manager 150 to monitor, log, adjust, improve, and/or optimize the performance (e.g., utilization of the allocated resources) of the program codes executed on the virtual compute system 110. The resource management data 150A may also include any management policies specified by the users or determined by the resource manager 150 for managing the resources on the virtual compute system 110, which are described below in greater detail.

As discussed above, the request itself may specify the amount of computing resources (e.g., memory, CPU, storage, network packets, etc.) to be used for executing the program code associated with the request. After such a request has been processed and a virtual machine instance has been assigned to the user associated with the request, the resource manager 150 may allocate the amount of resources specified in the request to the request by creating a container for the same amount of resources. For example, if the request specifies that 512 MB of memory is to be used for executing the program code associated with the request, the resource manager 150 may create a container having a memory size of 512 MB on the instance assigned to the user associated with the request. In some embodiments, other configuration information associated with the request, the program code, or the user may specify the amount of computing resources to be used for executing the program code. Such configuration information may be provided to the virtual compute system 110 either with the request or separately from the request. The resource manager 150 may maintain the amount of resources specified in the request as a default setting for the particular program code associated with the request and use the same amount for any subsequent requests that are processed on the virtual compute system 110. In some embodiments, the resource manager 150 may allow one or more subsequent requests to override such a default setting if the one or more subsequent requests indicate that a resource amount that is different from the default amount is to be allocated to the one or more subsequent requests. For example, a subsequent request may indicate that a resource amount that is 10% above the default amount is to be allocated to the subsequent request for executing the program code. Upon determining that the subsequent request indicates that an alternate amount of resources is to be allocated to the subsequent request for executing the program code, the resource manager 150 allocates the alternate amount of resources to the subsequent request.

In some embodiments, the amount of resources specified in the request may differ from the actual amount of resources allocated to the request. For example, in some scenarios, the virtual compute system 110 may allocate to the request an amount of resources that is a threshold percentage over the amount of resources specified in the request. In other situations, the virtual compute system 110 may allocate to the request an amount of resources that is a threshold percentage under the amount of resources specified in the request. Whether to over-subscribe or under-subscribe a particular resource may be determined based on the type of the particular resource, the user, the request, and/or the physical hardware (e.g., any tolerance or variance associated therewith) on which the particular resource is provided. In some embodiments, the amount of resources allocated to the request may be less than a maximum value (or percentage above the amount specified in the request) and/or greater than a minimum value (or percentage below the amount specified in the request) determined based on the type of the particular resource, the user, the request, and/or the physical hardware (e.g., any tolerance or variance associated therewith) on which the particular resource is provided.

In some embodiments, the particular type of resource specified in the request (e.g., memory) serves as a guideline for allocating other types of resource available on the virtual compute system 110. For example, if the request specifies that 512 MB of memory is to be used for executing the program code associated with the request, and the total (e.g., physical or virtual maximum) or available (e.g., resources not currently occupied by other containers) amount of memory on the instance assigned to the user is 2 GB, other types of resource (e.g., CPU, storage, network packets, etc.) available on the instance are also allocated in proportionate amounts (e.g., a quarter of the CPU, a quarter of the storage, a quarter of the network packets, etc. are allocated to the container). On the other hand, if the total or available amount of memory on the instance assigned to the user were 1 GB, half the CPU, half the storage, half the network packets would be allocated to the container. In some embodiments, the amount of memory that can be specified by the request or otherwise allocated to the container ranges from 64 MB to 1 GB, in 64 MB increments. In some embodiments, other amounts may be specified by the request and/or allocated to the container. Although memory is used as an example, any other resource may be selected and used as a guideline for setting the amount of all the resources to be allocated to process the request (e.g., to execute the program code). In some embodiments, a single form of resource (e.g., one that is easiest to understand, most user-friendly, most basic, largest in absolute number, or smallest in absolute number) is selected to be the representative for all other forms of resource. The request may specify, instead of an amount of a particular type of resource, a percentage that may be used for allocating all the resources. Additionally, the request may specify the amounts of more than one resource.

In some embodiments, the resource manager 150 may, instead of creating a new container and allocating the specified amount of resources to the container, locate an existing container having the specified amount of resources and cause the program code to be executed in the existing container. The amount of resources allocated to the existing container does not exactly match the specified amount of resources but is within a threshold percentage of the specified amount of resources. In some embodiments, the resource manager 150 may resize an existing container by allocating a fewer or greater amount of computing resource(s) and designate the existing container having an adjusted resource size to handle the program code associated with a particular program code. Whether the resource manager 150 can dynamically resize the existing container may depend on the language runtime used by the program code. For example, Java runtime might not allow dynamic resizing, whereas Python runtime might.

After a container having the specified amount of resources has been created or located, the program code associated with the request is executed in the container. The amount of resources allocated to the container (e.g., requested by the user) and/or the amount of resources actually utilized by the program code may be logged (e.g., by the monitoring/logging/billing services 107 and/or the resource manager 150) for further analysis. For example, the logged information may include the amount of memory, the amount of CPU cycles, the amount of network packets, and the amount of storage actually used during one or more executions of the program code in the container. Additionally, the logged information may include resource utilization, error rates, latency, and any errors or exceptions encountered during the execution of the program code. In some embodiments, any errors that are related to the amount of resources allocated to the container (e.g., out of memory exceptions) are tagged with a special marking and further analyzed by the resource manager 150.

In some embodiments, the resource manager 150 may create, or have access to, multiple classes of users, and apply different rules for different classes of users. For example, for more sophisticated users, more control may be given (e.g., control over individual resource parameters), whereas for other users, they may be allowed to control only a single representative parameter, and other parameters may be sized based on the representative parameter.

In some embodiments, the resource manager 150 may, based on the information logged by the monitoring/logging/billing services 107 and/or the resource manager 150, provide some guidance to the user as to what the user may do to improve the performance of the program code or to reduce costs associated with executing the program code on the virtual compute system 110. For example, the resource manager 150 may provide to the user, after seeing repeated occurrences of out of memory exceptions, an indication that the user appears to be consistently setting the memory (or other resource) too low for running a particular user code. Similarly, after determining that invocations of the particular user code have chronically used only a small portion of the resources allocated to them, the resource manager 150 may provide to the user an indication that the user may be setting the memory (or other resource) too high. The indication may specify the amount by which the particular resource(s) should be adjusted. In some embodiments, such an indication is provided to the user after a threshold number of errors, exceptions, or other telling conditions (e.g., increased latency) have been processed by the resource manager 150. The resource manager 150 may provide the indication via any notification mechanism including email, a push notification service, SMS, a social networking service, etc. In some embodiments, the indication that a resource sizing adjustment is needed is provided to the user if the amount by which one or more resources are to be adjusted exceeds a threshold value or percentage. For example, if the resource manager 150 determines that the memory size specified by the user should be increased by 0.5% to achieve better or optimal performance, the resource manager 150 may not send a notification to the user at all, but if the resource manager 150 determines that the memory size specified by the user should be increased by 10% to achieve better or optimal performance, the resource manager 150 may send the notification to the user.

In some embodiments, the resource manager 150 may offer a limited over-subscription where an execution of the program code is allowed to exceed the request amount of resources. For example, if the request specified 64 MB of memory, the resource manager 150 may allow the program code to use up to 70 or 80 MB of memory. In such a case, the program code may execute successfully, but a notification may be provided to the user that the program code exceeded the requested amount of memory and that future requests to execute the program code should specify a greater amount of memory. The over-subscription may expire after a threshold number of usage.

In some embodiments, the virtual compute system 110 may automatically adjust the amount of resources allocated to individual code execution requests. For example, in other embodiments where the user may specify the resource parameters, if the user fails to specify a proper amount of resources, the execution of the program code may suffer performance consequences. For example, if the request specifies that 64 MB of memory is to be used for executing a particular program code that actually requires 1 GB to run, the user may run into many problems (e.g., the program code may simply fail to execute). If the virtual compute system 110 relies on the user to adjust the amount of resources specified in the request, until the issue is addressed by the user, the virtual compute system 110 may receive thousands or millions of failed requests. In such a scenario, upon detecting that the amount of resources specified in the request is insufficient, the resource manager 150 may automatically adjust the amount of resources allocated to the incoming requests to execute the particular program code. In some embodiments, such an adjustment is made after a threshold number of errors, exceptions, or other telling conditions (e.g., increased latency) have been processed by the resource manager 150. Thus, although the first few requests may fail even with the automatic resource adjustments made by the resource manager 150, subsequent requests may eventually produce the desired outcomes even without user intervention.

In some embodiments, the resource manager 150 may utilize code-specific characteristics to improve the resource sizing for executing individual program codes. For example, program codes handling image processing might require a lot of memory, whereas program codes making database accesses might not require as much memory. In another example, for a particular program code, 64 MB might be sufficient most of the time, but the virtual compute system 110 might receive a burst of code execution requests associated with the user every night at 8 pm, for which the resource manager 150 may allocate more memory to the container and/or instance handling the requests associated with the user. Such code-specific characteristics may be maintained by the resource manager 150 and the resource sizing of individual program codes may be adjusted accordingly.

In some embodiments, the resource manager 150 may initially allocate the maximum amount of resources to the program code, and if the resource manager 150 determines, after running the program code, that the program code is actually using $\frac{1}{10}$ of the maximum amount, the resource manager 150 may allocate half of the maximum amount to subsequent requests to execute the program code. If the resource manager 150 still determines that the program code is using $\frac{1}{10}$ of the maximum amount, the resource manager 150 may further cut the amount of resources allocated to the program code by half. The resource manager 150 may repeat the process until the program code uses a significant portion (e.g., 50%, 75%, or another threshold value) of the resources allocated to the program code.

In some embodiments, the user may specify a resource management policy that dictates the behavior of the resource manager 150. For example, a user who is really price-conscious may be happy to let occasional errors go through, if doing so minimizes his or her costs. Thus, such a user may prefer not to increase the amount of resources allocated for executing his or her program codes, even if the currently specified amount of resources occasionally results in out of memory errors. On the other hand, a user who is very error-conscious may be willing to take any measures in order to avoid errors or mistakes (e.g., out of memory errors, a very high latency, or some other problem), from happening. Such a user may prefer to minimize the number of errors his or her program code encounters, even if the resources allocated for executing the program code are sometimes under-utilized. In some embodiments, the user may specify stop limits (e.g., lower and/or upper limit) for cost, utilization, amount of resources, etc. The user may further qualify such stop limits such that they are applicable only at specified time periods. For example, the user may specify the minimum and maximum amounts of money the user would like to spend to have a program code executed, but the user may further specify that during the last week of each quarter the limits are not to be applied.

In some embodiments, the resource manager 150 may selectively over-subscribe certain resources if the resource manager 150 determines that such resources are not being fully utilized by the code execution requests. For example, the resource manager 150 may allocate 1 GB of memory to five different containers on a virtual machine instance having 4 GB of virtual or physical memory. The degree of over-subscription may be based on how likely it is that those containers created on a single instance might collectively exhaust the maximum amount of resources of the instance. In some embodiments, the user may be given the option of choosing to utilize over-subscribed resources at a reduced cost.

In some embodiments, the request may not specify any resource-level constraints, but instead request that the amount of resources be automatically determined by the virtual compute system 110 and that the amount of resources determined by the virtual compute system 110 be communicated to the user (e.g., so that the user knows the amount of resources being allocated to service the user's requests). Alternatively, the request may specify the amount of resources to be used for running the user code, but also indicate that if the virtual compute system 110 determines that the requested amount of resources can be over-subscribed (e.g., by sharing it with other users) without significantly affecting the code execution performance, the virtual compute system 110 may do so by charging the user less (e.g., less than what the specified amount of resources would normally cost).

In some embodiments, the amount of resources allocated to a particular container is adjusted by contracting or expanding the particular container (e.g., by modifying the amount of resources allocated to the existing container). Alternatively, the amount of resources may be adjusted by creating a new container having an adjusted amount of resources and letting the old container die by funneling any future requests to the new container. In some embodiments, the resizing is performed based on the characteristics of the particular language runtime used by the program code (e.g., some may allow dynamic resource resizing and others may not).

The resource manager 150 may include a resource sizing unit for sizing the containers (e.g., determining the amount of resources to be allocated to the containers) to be used to execute the user code, and a resource guidance unit for providing notifications to the user regarding how the amount of resources should be adjusted, if at all. An example configuration of the resource manager 150 is described in greater detail below with reference to FIG. 2.

Figure 2:
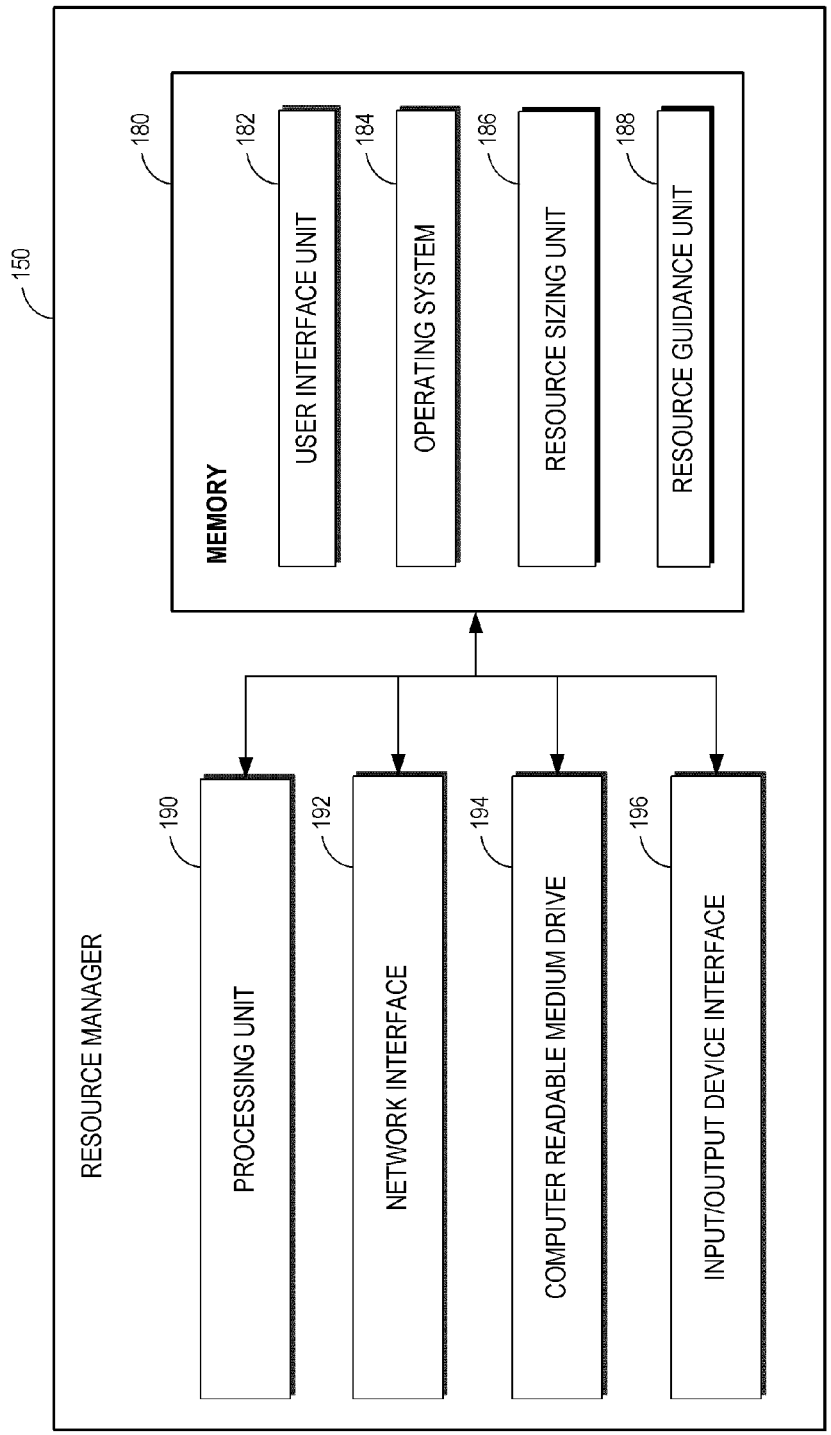
FIG. 2 depicts a general architecture of a computing device providing a resource manager for managing low latency compute capacity, according to an example aspect.

FIG. 2 depicts a general architecture of a computing system (referenced as resource manager 150) that manages the virtual machine instances in the virtual compute system 110. The general architecture of the resource manager 150 depicted in FIG. 2 includes an arrangement of computer hardware and software modules that may be used to implement aspects of the present disclosure. The resource manager 150 may include many more (or fewer) elements than those shown in FIG. 2. It is not necessary, however, that all of these generally conventional elements be shown in order to provide an enabling disclosure. As illustrated, the resource manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the resource manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a resource sizing unit 186 and a resource guidance unit 188 that may be executed by the processing unit 190. In one embodiment, the user interface unit 182, resource sizing unit 186, and resource guidance unit 188 individually or collectively implement various aspects of the present disclosure, e.g., monitoring and logging the execution of program codes on the virtual compute system 110, determining the need for adjusting the amount of resources allocated to particular containers and/or requests, providing notifications to the user regarding the need to adjust the amount of resources, automatically adjusting the amount of resources, etc. as described further below.

The resource sizing unit 186 monitors execution of user code on the virtual compute system 110, provides containers having specified amounts of resources for executing the user code, and adjusts the amount of resources allocated to the containers. For example, if the resource sizing unit 186 determines that requests to execute a particular program code is consistently getting out of memory errors, the resource sizing unit 186 may increase the amount of memory allocated to subsequent requests to execute the particular program code. On the other hand, if the resource sizing unit 186 determines that requests to execute a particular program code is consistently using only a fraction of the resources allocated to the requests, the resource sizing unit 186 may decrease the amount of memory allocated to subsequent requests to execute the particular program code.

The resource guidance unit 188 provide notifications to the user regarding the need to adjust the amount of resources being allocated to service the requests associated with the user. For example, the notifications may indicate that the user is consistently specifying an amount that is too low or too high for executing the particular program code. The notifications may further specify how the amount of resources should be adjusted for improved or optimal performance.

While the resource sizing unit 186 and the resource guidance unit 188 are shown in FIG. 2 as part of the resource manager 150, in other embodiments, all or a portion of the resource sizing unit 186 and the resource guidance unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the resource manager 150.

Figure 3:
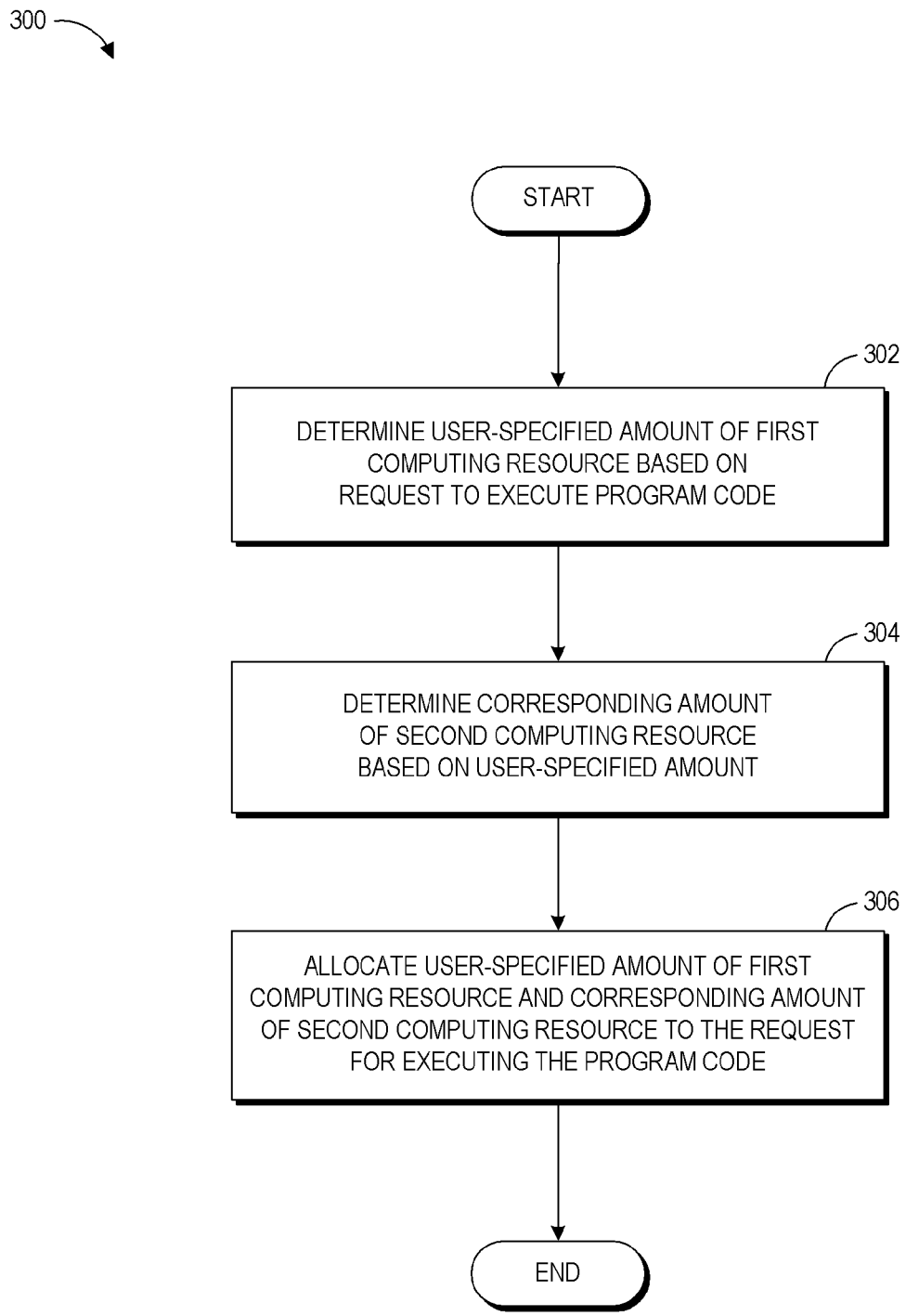
FIG. 3 is a flow diagram illustrating a resource sizing routine implemented by a resource manager, according to an example aspect.

Turning now to FIG. 3, a routine 300 implemented by one or more components of the virtual compute system 110 (e.g., the resource manager 150) will be described. Although routine 300 is described with regard to implementation by the resource manager 150, one skilled in the relevant art will appreciate that alternative components may implement routine 300 or that one or more of the blocks may be implemented by a different component or in a distributed manner.

At block 302 of the illustrative routine 300, the resource manager 150 determines a user-specified amount of a first computing resource based on a request to execute program code on the virtual compute system 110. For example, the first computing resource may be memory, CPU, disk space, or any other computing resource that may be used for executing the program code on the virtual compute system 110. The request to execute the program code on the virtual compute system 110 may indicate how much resource is to be allocated for executing the program code.

Next, at block 304, the resource manager 150 determines a corresponding amount of a second computing resource based on the user-specified amount of the first computing resource. For example, the resource manager 150 may determine the corresponding amount of the second computing resource by calculating the ratio between the user-specified amount of the first computing resource and the maximum amount of the first computing resource available to be allocated to the request. If the user-specified amount is 512 MB of memory, and the maximum amount of memory available to be allocated to the request is 1 GB, the resource manager 150 may determine that the corresponding amount should be one half of the maximum amount of the second computing resource available to be allocated to the request. For example, if the second computing resource is disk space and 8 GB of disk space is available for allocation, the resource manager 150 may determine that the corresponding amount should be 4 GB.

At block 306, the resource manager 150 allocates the user-specified amount of the first computing resource (e.g., memory) and the corresponding amount of the second computing resource (e.g., disk space) to the request for executing the program code. In the example above, the resource manager 150 may create a container on one of the virtual machine instances available on the virtual compute system, where the container is allocated 512 MB of memory and 4 GB of disk space. Although first and second computing resources are used in the example of FIG. 3, additional resources may be used, and such additional resources may also be sized according to the ratio between the user-specified amount and the maximum amount of the first computing resource.

While the routine 300 of FIG. 3 has been described above with reference to blocks 302-306, the embodiments described herein are not limited as such, and one or more blocks may be omitted, modified, or switched without departing from the spirit of the present disclosure.

Figure 4:
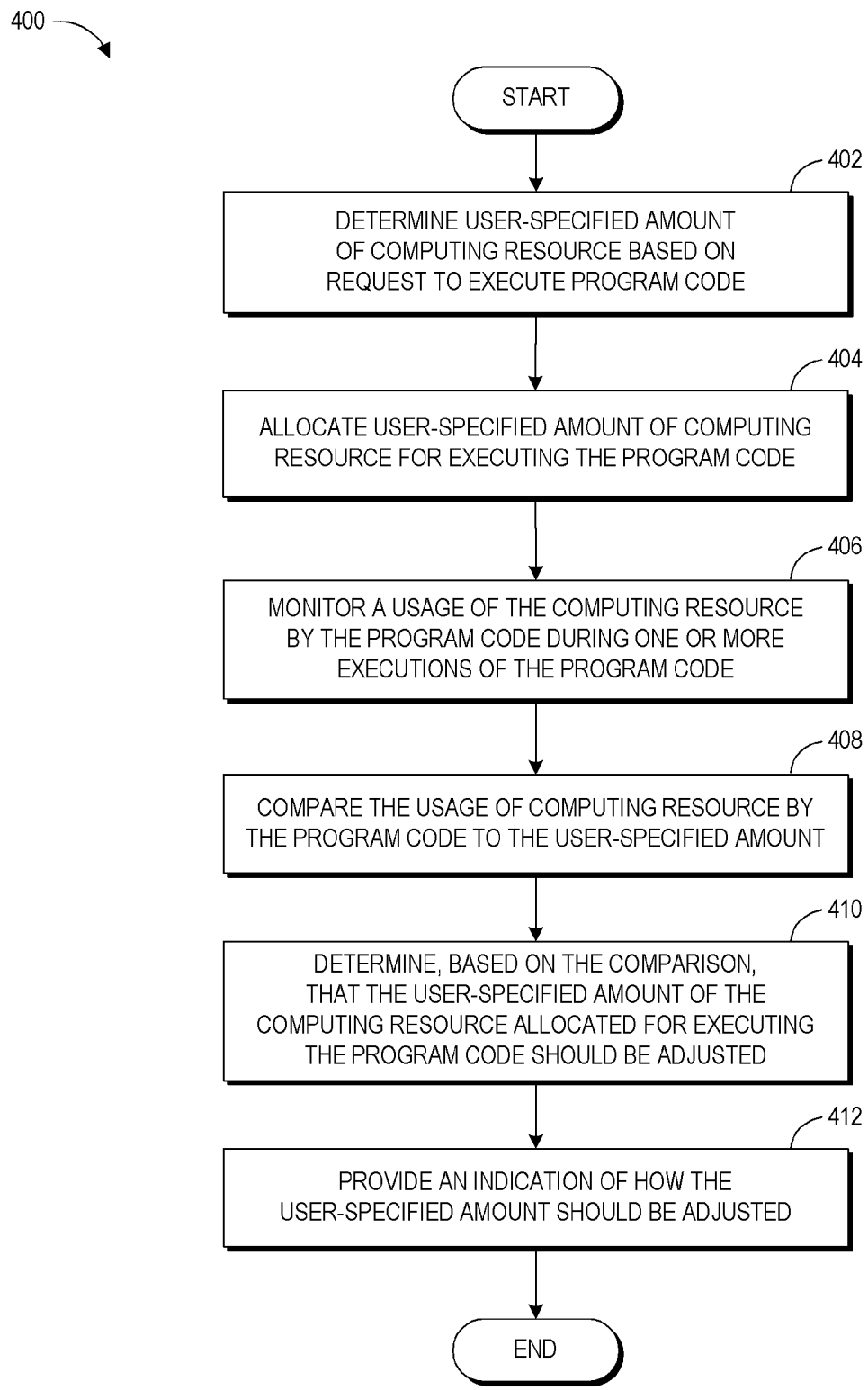
FIG. 4 is a flow diagram illustrating a resource sizing routine implemented by a resource manager, according to another example aspect.

Turning now to FIG. 4, a routine 400 implemented by one or more components of the virtual compute system 110 (e.g., the resource manager 150) will be described. Although routine 400 is described with regard to implementation by the resource manager 150, one skilled in the relevant art will appreciate that alternative components may implement routine 400 or that one or more of the blocks may be implemented by a different component or in a distributed manner.

At block 402 of the illustrative routine 400, the resource manager 150 determines a user-specified amount of a computing resource based on a request to execute program code on the virtual compute system 110. For example, the computing resource may be memory, CPU, disk space, or any other computing resource that may be used for executing the program code on the virtual compute system 110. The user-specified amount may be an amount of a particular resource (e.g., memory) that is indicated in the request (e.g., included in the request or otherwise determinable based on information included in the request) that specifies how much of the particular resource is to be allocated for executing the program code. For example, the developer of a program code may specify in a code execution request how much memory (or other computing resources) is to be allocated for executing his or her program code.

Next, at block 404, the resource manager 150 allocates the user-specified amount of the computing resource for executing the program code. For example, the resource manager 150 may create a container that has the user-specified amount of the computing resource in an instance that is associated with the user and is in the active pool 140A. In another example, the resource manager 150 may select an instance from the warming pool 130A, assign the selected instance to the user, and create a container that has the user-specified amount of the computing resource in the selected instance.

At block 406, the resource manager 150 monitors the usage of the computing resource by the program code during one or more executions of the program code. For example, the resource manager 150 may cause the program code to be loaded onto the container designated to handle the request and cause the program code to be executed in the container. The resource manager 150 may monitor one or more performance characteristics during the one or more executions of the program code. Such performance characteristics may include error rates, resource utilization, latency, % of resource used, % of resource requested by the user, etc.

At block 408, the resource manager 150 compares the usage of the computing resource by the program code to the user-specified amount, and at block 410, the resource manager 150 determines, based on the comparison, that the user-specified amount of the computing resource allocated for executing the program code should be adjusted. For example, if the user requested 512 MB of memory but only 64 MB was used on average during the one or more executions of the program code, the resource manager 150 may determine that the user-specified amount may be reduced without significantly affecting the performance of the program code. On the other hand, if the user requested 512 MB of memory and nearly all of the requested amount was in use during the one or more executions of the program code, the resource manager 150 may determine that the user-specified amount should be increased to resolve the over-utilization issue.

At block 412, the resource manager 150 provides an indication of how the user-specified amount should be adjusted. For example, the resource manager 150 may provide an email notification to the user indicating that the user-specified amount should be increased or decreased by an appropriate amount.

While the routine 400 of FIG. 4 has been described above with reference to blocks 402-412, the embodiments described herein are not limited as such, and one or more blocks may be omitted, modified, or switched without departing from the spirit of the present disclosure. For example, although the routine 400 is described with reference to a single computing resource (e.g., memory), similar techniques may be performed on each of the remaining resource dimensions (e.g., CPU, network, disk, etc.). Further, although the routine 400 is described as monitoring and comparing a single computing resource on a per-resource basis (e.g., comparing the requested amount of memory vs. actually used amount of memory, comparing the requested amount of processing power vs. actually used amount of processing power, etc.), similar techniques may be used to perform the routine 400 on a composite basis. For example, the resource manager 150 may compare the requested or allocated amount of the most constrained resource associated with the request with the actual amount of the most constrained resource used by the program code associated with the request, and the indication in block 412 may be provided to the user if the requested or allocated amount of the most constrained resource is within a threshold percentage under or over the actual amount of the most constrained resource used by the program code. In another example, the resource manager 150 may calculate the average percentage of utilization for each of the resource dimensions, and provide the indication to the user if the average percentage is under or over a threshold utilization value (e.g., below 10%, above 90%, etc.). The indication provided to the user may also include a breakdown of the over-usage or under-usage of each of computing resource. For example, the resource manager 150 may provide an indication that says, "You currently have your resource sizing dial at 512 MB, which is fine for memory performance because you never use more memory than that, but we have noticed that you often run out of network resources with the current setting. You may turn the resource sizing dial up by 10% to obtain more network resources and achieve improved code execution performance."

Figure 5:
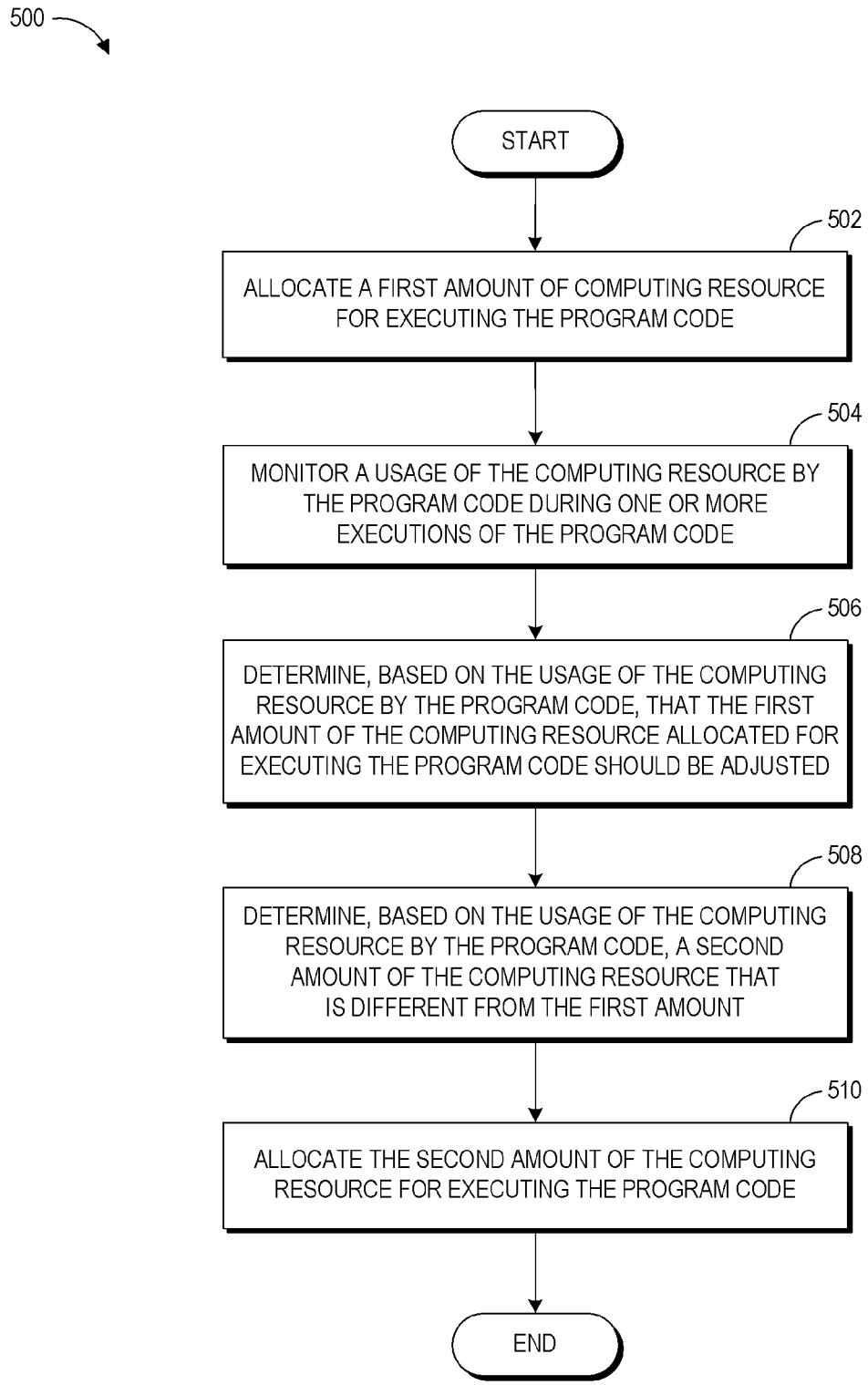
FIG. 5 is a flow diagram illustrating a resource sizing routine implemented by a resource manager, according to another example aspect.

Turning now to FIG. 5, a routine 500 implemented by one or more components of the virtual compute system 110 (e.g., the resource manager 150) will be described. Although routine 500 is described with regard to implementation by the resource manager 150, one skilled in the relevant art will appreciate that alternative components may implement routine 500 or that one or more of the blocks may be implemented by a different component or in a distributed manner.

At block 502 of the illustrative routine 500, the resource manager 150 allocates a first amount of a computing resource for executing a program code. For example, the resource manager 150 may create a container that has the first amount of the computing resource in an instance that is associated with the user and is in the active pool 140A. In another example, the resource manager 150 may select an instance from the warming pool 130A, assign the selected instance to the user, and create a container that has the first amount of the computing resource in the selected instance. The computing resource may be memory, CPU, disk space, or any other computing resource that may be used for executing the program code on the virtual compute system 110. The first amount may be determined by the resource manager 150 based on information included in the request and/or information ascertainable based on the information included in the request. Such information may include the programming language used to code the program code, user type (e.g., high-volume user or low-volume user), characteristics of the program code (e.g., number of lines, number of expensive calls, etc.), etc.

Next, at block 504, the resource manager 150 monitors the usage of the computing resource by the program code during one or more executions of the program code. For example, the resource manager 150 may cause the program code to be loaded onto the container designated to handle the request and cause the program code to be executed in the container. The resource manager 150 may monitor one or more performance characteristics during the one or more executions of the program code. Such performance characteristics may include error rates, resource utilization, latency, % of resource used, % of resource requested by the user, etc.

At block 506, the resource manager 150 determines, based on the usage of the computing resource by the program code, that the first amount of the computing resource allocated for executing the program code should be adjusted. For example, if 512 MB of memory was allocated for executing the program code at block 502 but only 64 MB was used on average during the one or more executions of the program code, the resource manager 150 may determine that the amount allocated for executing the program code may be reduced without significantly affecting the performance of the program code. On the other hand, if 512 MB of memory was allocated for executing the program code and nearly all of the allocated amount was in use during the one or more executions of the program code, the resource manager 150 may determine that the amount allocated for executing the program code should be increased to resolve the over-utilization issue.

At block 508, the resource manager 150 determines a second amount of the computing resource that is different from the first amount, and at block 510, the resource manager 150 allocates the second amount of the computing resource for executing the program code. In the example in which 512 MB was allocated and 64 MB was used on average, the resource manager 150 may determine that the amount of allocated memory may be safely reduced to 128 MB without affecting the performance of the program code, and allocate 128 MB for executing the program code (e.g., for future executions of the program code).

While the routine 500 of FIG. 5 has been described above with reference to blocks 502-512, the embodiments described herein are not limited as such, and one or more blocks may be omitted, modified, or switched without departing from the spirit of the present disclosure. For example, as discussed in connection with FIG. 4, although the routine 500 is described with reference to a single computing resource (e.g., memory), similar techniques may be performed on each of the remaining resource dimensions (e.g., CPU, network, disk, etc.). Further, although the routine 500 is described as monitoring and comparing a single computing resource on a per-resource basis (e.g., comparing the currently allocated amount of memory vs. actually used amount of memory, comparing the currently allocated amount of processing power vs. actually used amount of processing power, etc.), similar techniques may be used to perform the routine 500 on a composite basis. For example, the resource manager 150 may compare the requested or allocated amount of the most constrained resource associated with the request with the actual amount of the most constrained resource used by the program code associated with the request, and the determination in block 506 may be based on whether the requested or allocated amount of the most constrained resource is within a threshold percentage under or over the actual amount of the most constrained resource used by the program code. In another example, the resource manager 150 may calculate the average percentage of utilization for each of the resource dimensions, and make the determination based on whether the average percentage is under or over a threshold utilization value (e.g., below 10%, above 90%, etc.).

Figure 6:
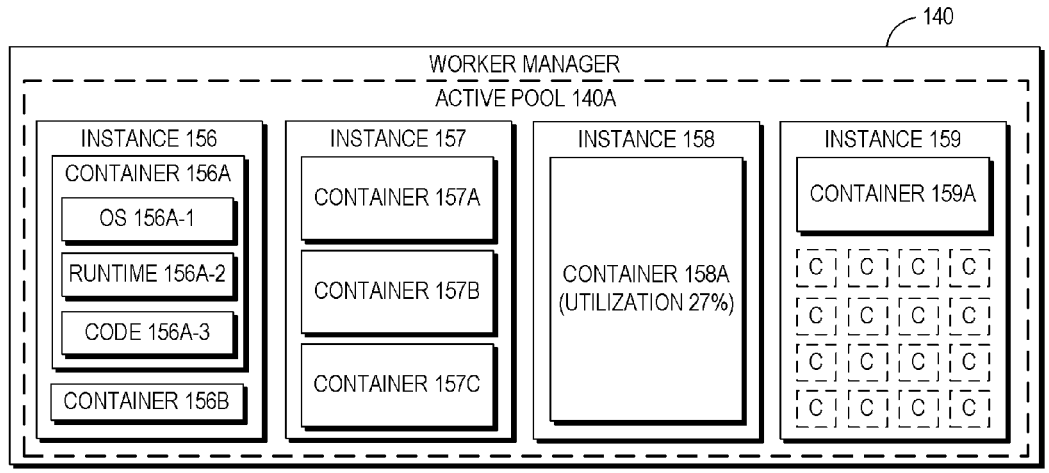
FIGS. 6-8 illustrate a resource sizing performed by a resource manager, according to an example aspect.
Figure 7:
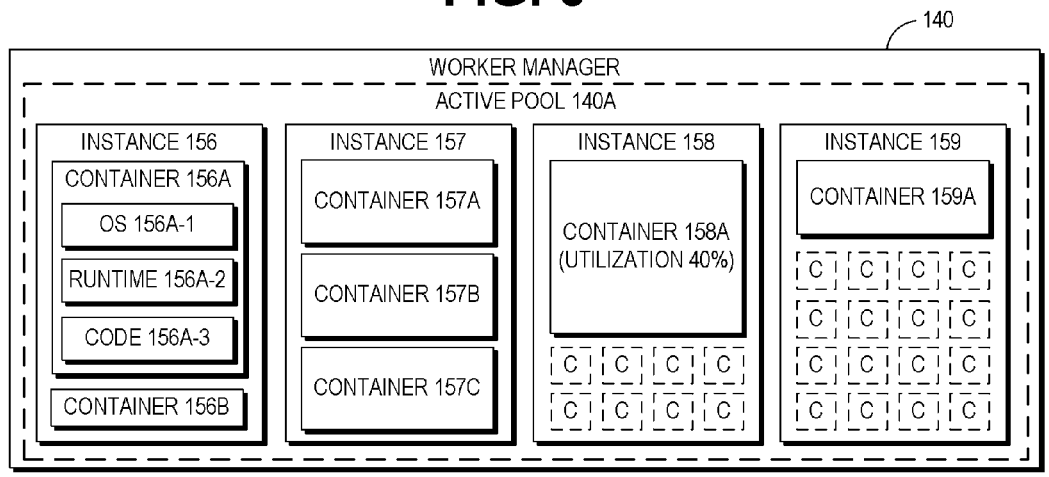
Figure 8:
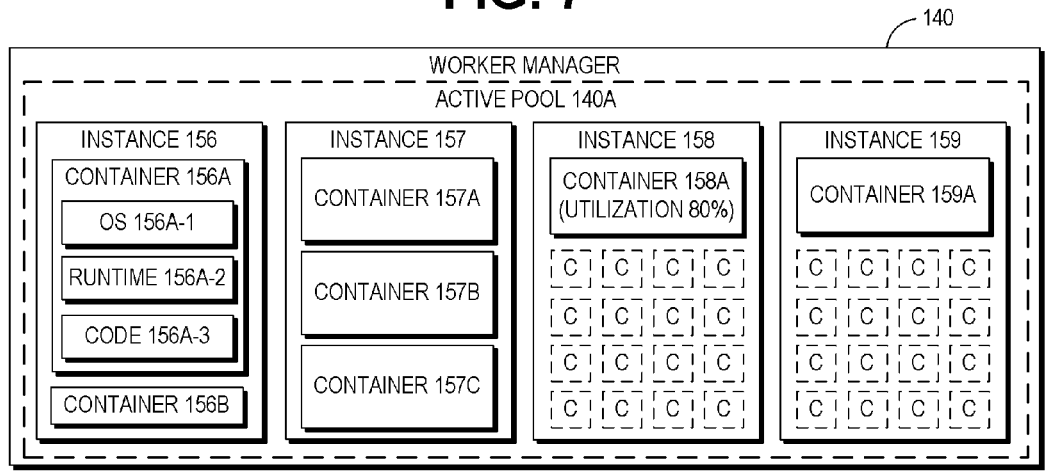

With reference to FIGS. 6-8, the resource resizing performed by the resource manager 150 according to an example embodiment is illustrated. In the example of FIG. 6, the container 158A is being utilized to process incoming code execution requests associated with a particular program code. As shown in FIG. 6, the container 158A has an average resource utilization of 27%. For example, the particular program code has utilized 27% of the resource(s) allocated to the container 158A during one or more executions of the particular program code in the container 158A. The resource manager 150 may compare the resource utilization to a threshold value (e.g., 75%) and determine that the current resource utilization is too low and that the amount of resource(s) allocated to the container 158A should be reduced.

In FIG. 7, the resource manager 150 has reduced the amount of resource(s) allocated to the container 158A for executing the particular program code (e.g., at the request of the user associated with the instance 158 or based on a determination made by the resource manager 150 based on utilization), and the resource utilization has increased to 40% after one or more additional executions of the particular program code in the container 158A. Although the resource sizing of an existing container (e.g., container 158A) is adjusted, in another embodiment, a new container having an adjusted amount of resource(s) allocated thereto may be created instead, and the existing container may be drained. As shown in FIG. 8, the amount of resource(s) allocated to the container 158A has further been adjusted to improve the resource utilization to 80%. The resource manager 150 may compare the resource utilization level to the threshold value (e.g., 75%) and determine that further resource resizing is not necessary, and maintain the resource level of the container 158A at the current level until the resource manager 150 later determines a further resizing is needed. Other components shown in FIGS. 6-8 are identical to those shown in FIG. 1 and the details thereof are thus omitted for brevity.

Figure 9:
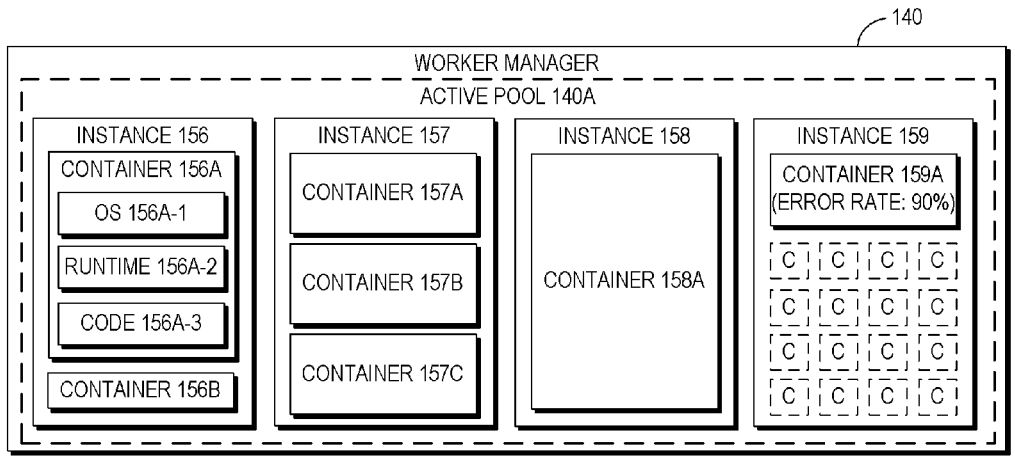
FIGS. 9-11 illustrate a resource sizing performed by a resource manager, according to another example aspect.
Figure 10:
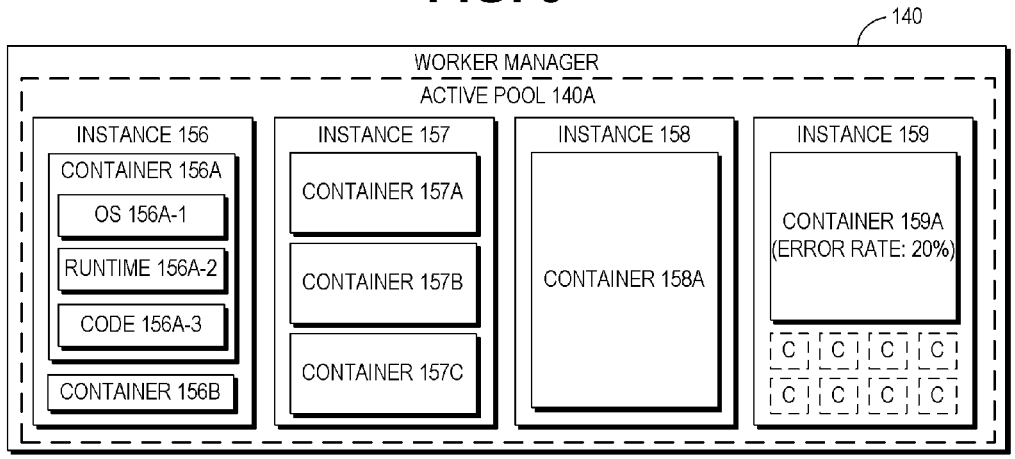
Figure 11:
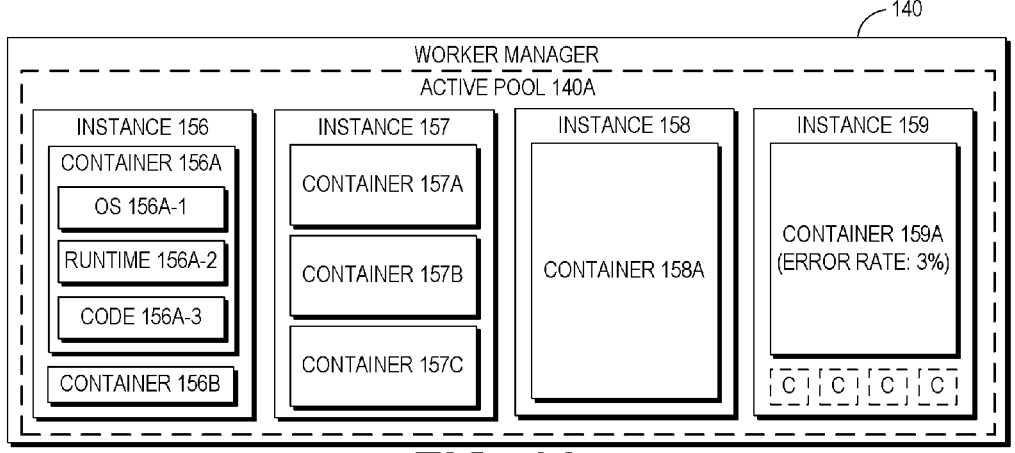

With reference to FIGS. 9-11, the resource resizing performed by the resource manager 150 according to another example embodiment is illustrated. In the example of FIG. 9, the container 159A is being utilized to process incoming code execution requests associated with a particular program code. As shown in FIG. 9, the container 159A has an average error rate of 90%. For example, 90% of the executions of the particular program code may have produced one or more errors or failed to successfully execute. The resource manager 150 may compare the resource utilization to a threshold value (e.g., 5%) and determine that the current error rate is too high and that the amount of resource(s) allocated to the container 159A should be increased.

In FIG. 10, the resource manager 150 has increased the amount of resource(s) allocated to the container 159A for executing the particular program code (e.g., at the request of the user associated with the instance 159 or based on a determination made by the resource manager 150 based on the error rate), and the error rate has decreased to 20% after one or more additional executions of the particular program code in the container 159A. Although the resource sizing of an existing container (e.g., container 159A) is adjusted, in another embodiment, a new container having an adjusted amount of resource(s) allocated thereto may be created instead, and the existing container may be drained. As shown in FIG. 11, the amount of resource(s) allocated to the container 159A has further been adjusted to improve the error rate to 3%. The resource manager 150 may compare the error rate to the threshold value (e.g., 5%) and determine that further resource resizing is not necessary, and maintain the resource level of the container 159A at the current level until the resource manager 150 later determines a further resizing is needed. Other components shown in FIGS. 9-11 are identical to those shown in FIG. 1 and the details thereof are thus omitted for brevity.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
as implemented by one or more computing devices configured with specific executable instructions,
maintaining a plurality of virtual machine instances on one or more physical computing devices;
determining, based on a request to execute a program code associated with a user on a virtual compute system, a user-specified amount of a first computing resource;
selecting one of the plurality of virtual machine instances to be used for executing the program code, the selected virtual machine instance having the first computing resource having a first maximum amount and a second computing resource having a second maximum amount, the second computing resource being different from the first computing resource;
determining a first ratio of the user-specified amount to the first maximum amount;
determining the corresponding amount of the second computing resource based on the determined first ratio and the second maximum amount, wherein a second ratio of the corresponding amount to the second maximum amount is identical to the first ratio;
selecting a first container having the user-specified amount of the first computing resource and the corresponding amount of the second computing resource for executing the program code;
causing the program code to be executed in the selected container;
recording actual amounts of the first and second computing resources used by the program code during the execution of the program code;
maintaining the user-specified amount in association with the program code associated with the user;
determining that the user-specified amount is to be overridden by an alternate amount specified in a subsequent request to execute the program code; and
selecting a second container having the alternate amount of the first or second computing resources for executing the program code.

2. The computer-implemented method of claim 1, further comprising recording errors or conditions detected during an execution of the program code, the errors or conditions being caused by a level of utilization of at least one of the first computing resource or the second computing resource.

3. The computer-implemented method of claim 1, further comprising over-subscribing the selected virtual machine instance such that a sum of the user-specified amount of the first computing resource of each container created in the selected virtual machine instance exceeds the first maximum amount.

4. The computer-implemented method of claim 1, further comprising maintaining a first class of users and a second class of users, wherein the first class of users are allowed to specify resource amounts for multiple computing resources, and the second class of users are restricted to specifying a resource amount for only one of the multiple computing resources.

5. A system adapted to provide low-latency computational capacity from a virtual compute fleet, the system comprising:
an electronic data store configured to store at least a program code of a user; and
a virtual compute system comprising one or more hardware computing devices adapted to execute specific computer-executable instructions, said virtual compute system in communication with the electronic data store, and configured to at least:
maintain a plurality of virtual machine instances on one or more physical computing devices, wherein the plurality of virtual machine instances comprise a warming pool comprising virtual machine instances having one or more software components loaded thereon and waiting to be assigned to a user, and an active pool comprising virtual machine instances currently assigned to one or more users;
receive a request to execute a program code associated with a user on the virtual compute system, the request including information indicating the program code and the user associated with the program code;
select from the warming pool or the active pool a virtual machine instance to execute the program code, the selected virtual machine instance having a first computing resource and a second computing resource, wherein a first maximum amount specifies a maximum amount of the first computing resource available to be provided by the selected virtual machine instance, and a second maximum amount specifies a maximum amount of the second computing resource available to be provided by the selected virtual machine instance;
determine, based on the received request, a user-specified amount of the first computing resource specified by the user;
determine a first ratio of the user-specified amount to the first maximum amount of the first computing resource;
determine a corresponding amount of the second computing resource based on the first ratio and the second maximum amount, wherein a second ratio of the corresponding amount to the second maximum amount is identical to the first ratio;
create a container in the selected virtual machine instance based on the user-specified amount of the first computing resource and the corresponding amount of the second computing resource; and
cause the program code associated with the user to be loaded from the electronic data store onto the container and executed in the container.

6. The system of claim 5, wherein the virtual compute system is further configured to record actual amounts of the first and second computing resources used for executing the program code in the container.

7. The system of claim 5, wherein the virtual compute system is further configured to over-subscribe the selected virtual machine instance such that a sum of the user-specified amount of the first or second computing resource of each container created in the selected virtual machine instance exceeds the first maximum amount.

8. A system, comprising:
a virtual compute system comprising one or more hardware computing devices executing specific computer-executable instructions and configured to at least:
maintain a plurality of virtual machine instances on one or more physical computing devices;
determine, based on a request to execute a program code associated with a user on the virtual compute system, a user-specified amount of a first computing resource;

select one of the plurality of virtual machine instances to be used for executing the program code, the selected virtual machine instance having the first computing resource having a first maximum amount and a second computing resource having a second maximum amount, the second computing resource being different from the first computing resource;

determine a first ratio of the user-specified amount to the first maximum amount;

determine the corresponding amount of the second computing resource based on the determined first ratio and the second maximum amount, wherein a second ratio of the corresponding amount to the second maximum amount is identical to the first ratio;

create a container in the selected virtual machine instance, the container having the user-specified amount of the first computing resource and the corresponding amount of the second computing resource;

cause the program code to be executed in the container;

record actual amounts of the first and second computing resources used by the program code during execution of the program code;

maintain the user-specified amount in association with the program code associated with the user;

determine that the user-specified amount is to be overridden by an alternate amount specified in a subsequent request to execute the program code;

allocate the alternate amount of the first or second computing resources to the subsequent request for executing the program code.

9. The system of claim 8, wherein the virtual compute system is further configured to record errors or conditions detected during an execution of the program code, the errors or conditions being caused by a level of utilization of at least one of the first computing resource or the second computing resource.

10. The system of claim 8, wherein the virtual compute system is further configured to maintain a first class of users and a second class of users, wherein the first class of users are allowed to specify resource amounts for multiple computing resources, and the second class of users are restricted to specifying a resource amount for only one of the multiple computing resources.

11. The system of claim 8, wherein the virtual compute system is further configured to determine, based on the user-specified amount, a resource amount of at least one computing resource other than the first and second computing resources.

12. The system of claim 8, wherein the virtual compute system is further configured to over-subscribe the selected virtual machine instance such that a sum of the user-specified amount of the first or second computing resource of each container created in the selected virtual machine instance exceeds the first maximum amount.

13. A computer-readable, non-transitory storage medium storing computer executable instructions that, when executed by one or more computing devices, configure the one or more computing devices to perform operations comprising:

maintaining a plurality of virtual machine instances on one or more physical computing devices;

determining, based on a request to execute a program code associated with a user on a virtual compute system, a user-specified amount of a first computing resource;

selecting one of the plurality of virtual machine instances to be used for executing the program code, the selected virtual machine instance having the first computing resource having a first maximum amount and the second computing resource having a second maximum amount, the second computing resource being different from the first computing resource;

determining a first ratio of the user-specified amount to the first maximum amount;

determining the corresponding amount of the second computing resource based on the determined first ratio and the second maximum amount, wherein a second ratio of the corresponding amount to the second maximum amount is identical to the first ratio;

selecting a first container having the user-specified amount of the first computing resource and the corresponding amount of the second computing resource to the request for executing the program code;

causing the program code to be executed in the selected container;

recording actual amounts of the first and second computing resources used by the program code during the execution of the program code;

maintaining the user-specified amount in association with the program code associated with the user;

determining that the user-specified amount is to be overridden by an alternate amount specified in a subsequent request to execute the program code; and selecting a second container having the alternate amount of the first or second computing resources for executing the program code.

14. The computer-readable, non-transitory storage medium of claim 13, wherein the operations further comprise recording errors or conditions detected during an execution of the program code, the errors or conditions being caused by a level of utilization of at least one of the first computing resource or the second computing resource.

15. The computer-readable, non-transitory storage medium of claim 13, wherein the virtual compute system is further configured to over-subscribe the selected virtual machine instance such that a sum of the user-specified amount of the first or second computing resource of each container created in the selected virtual machine instance exceeds the first maximum amount.

16. The computer-readable, non-transitory storage medium of claim 13, wherein the operations further comprise maintaining a first class of users and a second class of users, wherein the first class of users are allowed to specify resource amounts for multiple computing resources, and the second class of users are restricted to specifying a resource amount for only one of the multiple computing resources.

* * * * *